May 12, 1964     E. J. WILLIAMS     3,132,508
PRESSURE TESTER AND REJECTER
Filed Feb. 9, 1961     2 Sheets-Sheet 1

INVENTOR.
EDWARD J. WILLIAMS
BY
Dominik, Lazo & Worth
ATTORNEYS

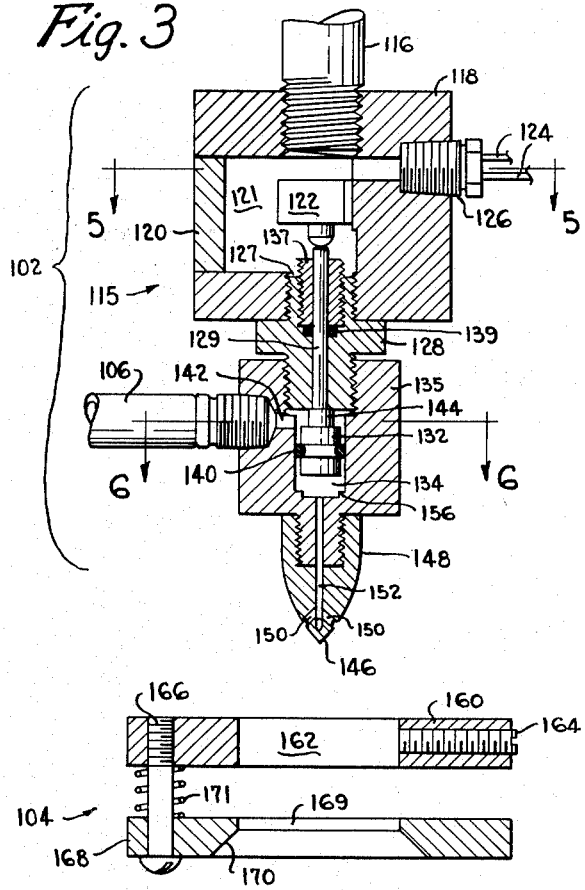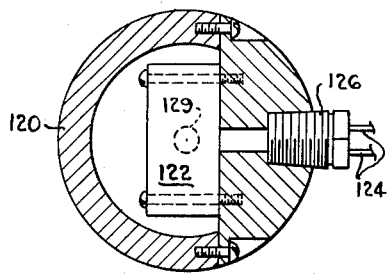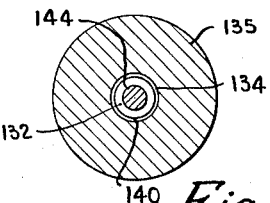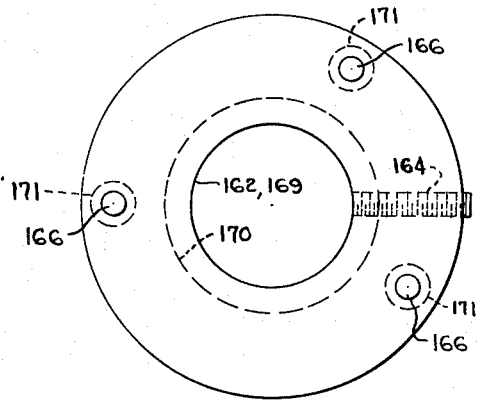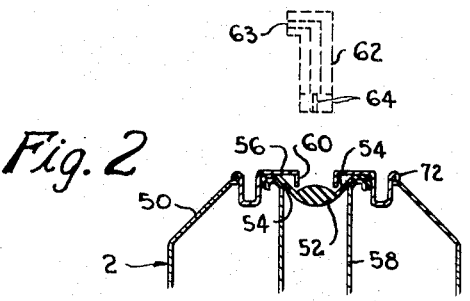

United States Patent Office 3,132,508
Patented May 12, 1964

3,132,508
PRESSURE TESTER AND REJECTER
Edward J. Williams, Evanston, Ill., assignor to
Gard Industries, Inc., Northfield, Ill.
Filed Feb. 9, 1961, Ser. No. 101,311
9 Claims. (Cl. 73—52)

The present invention relates broadly to a method and mechanism for determining pressure within a container, with particular application to pressure determinations wherein a large number of internally pressurized containers are inspected. An important usage of the invention is found in the production of aerosol-type dispensers to indicate whether the pressure within an aerosol-type dispenser is above a preselected safe minimum.

Aerosol-type dispensers have in recent times been employed as packages and dispensing means for a wide variety of materials. Huge quantities of such dispensers daily flow through retail channels into the hands of housewives, artisans, cosmeticians, and the like. In addition to maintaining the quality of the material dispensed, the manufacturer of products which are packaged in aerosol-type dispensers is now faced with the problem of maintaining the quality of the dispensing system so that all of such material is dispensed in a proper and suitable state, e.g., a foam such as whipped cream or shaving soap, or a dispersed divided fluid such as paint. Failure to meet this additional problem can have a serious effect on the acceptability to consumers os a manufacturer's product.

Aerosol-type dispensers comprise a valved container suitable for withstanding and maintaining a positive internal fluid pressure. Such pressure is provided mainly by a propellent which comprises either a thermodynamically saturated liquid admixed with the material to be dispensed, or a pressurized gas. The propellent, through its pressure, is employed as the driving means whereby the material is dispensed.

Where propellent pressure is too high, particularly in the case of a pressurized gas, excessive quantities of material are dispensed and sometimes with an undesirable amount of splattering. In addition the entire package is unsafe if subjected to unusually high temperatures. Where propellent pressure is too low, particularly in the case of a pressurized gas, it is often not possible to dispense all of the contents of the package; also, propellent power is sometimes inadequate for dispensing the material in a proper form. The problem of determining whether the pressure is within suitable limits is further complicated by the huge production volume of materials in such dispensers inasmuch as it is a practical necessity to inspect each such dispenser once the propellent has been lodged therein.

Aerosol-type dispensers are rapidly becoming of increasing commercial importance in the food industry. Foods, flavoring materials, essences, concentrates, extracts, and solutions thereof various spices, fruits, vegetables, flavorants and the like, are included in the wide variety of products the food industry is packaging in aerosol-type containers. Many of such products are difficult and/or expensive to produce and a pressurized gas is preferably used as the propellent. Thus, it becomes important that a safe minimum propellent pressure be provided. About ninety-four pounds per square inch has been found to be a satisfactory safe minimum pressure.

A principal object of the present invention is to provide a method and an apparatus for determining pressure within a container, more particularly the pressure within aerosol-type container. The invention is advantageously applicable to such pressure determinations where the propellent comprises a pressurized gas. The invention is preferably applied to determining if container pressure is above a preselected minimum.

Another object of the invention is the provision of a method and an apparatus for determining if pressure of a gaseous medium with an aerosol-type container is above or below a preselected minimum. A further object is the provision of a method and apparatus for determining if a pressure within an aerosol-type container is within, preferably above, a preselected tolerance and, in response to such determination, rejecting such a container. In this latter connection, it is still another object of the invention to provide a method and apparatus for comparing with a known pressure that pressure within an aerosol-type container, which method and apparatus are suitable for combining with automated or mass-production methods and apparatus, respectively.

To these ends, the invention contemplates an apparatus having a pressure-transmitting means for insertion into the valve of an aerosol-type container and transmission of container pressure to a comparing means. The comparing means employs a standard pressure established by a suitable source and compares the standard pressure with the pressure within the container. Where the comparison is unfavorable, e.g., where the container pressure is too low, a signal is established. The container is subsequently rejected in response to the signal, the rejection preferably taking place automatically.

Other objects, advantages and features will become evident from reading the following detailed description in conjunction with the drawings wherein:

FIG. 2 is a cross section of a representative type of a container and valve, it being understood that other types of containers and valves for aerosol-type containers are usable with the invention.

FIG. 3 is a cross section of a pressure tester according to the invention.

FIG. 4 is a cross section of an adapter suitable for use with the pressure tester of FIG. 3.

FIGS. 5 and 6 are cross sections of the pressure tester as taken through sections 5—5 and 6—6 of FIG. 3.

FIG. 7 is a top view of FIG. 4.

Figure 8:
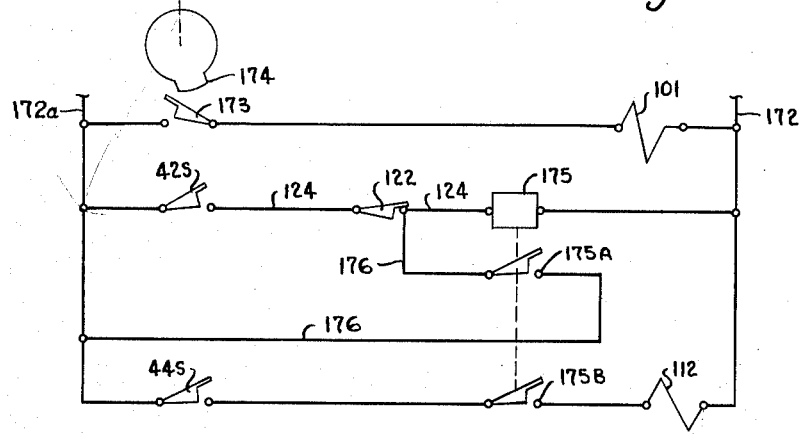

FIG. 8 is a schematic presentation of a means for coactingly connecting the pressure tester to a means for rejecting.

Figure 1:
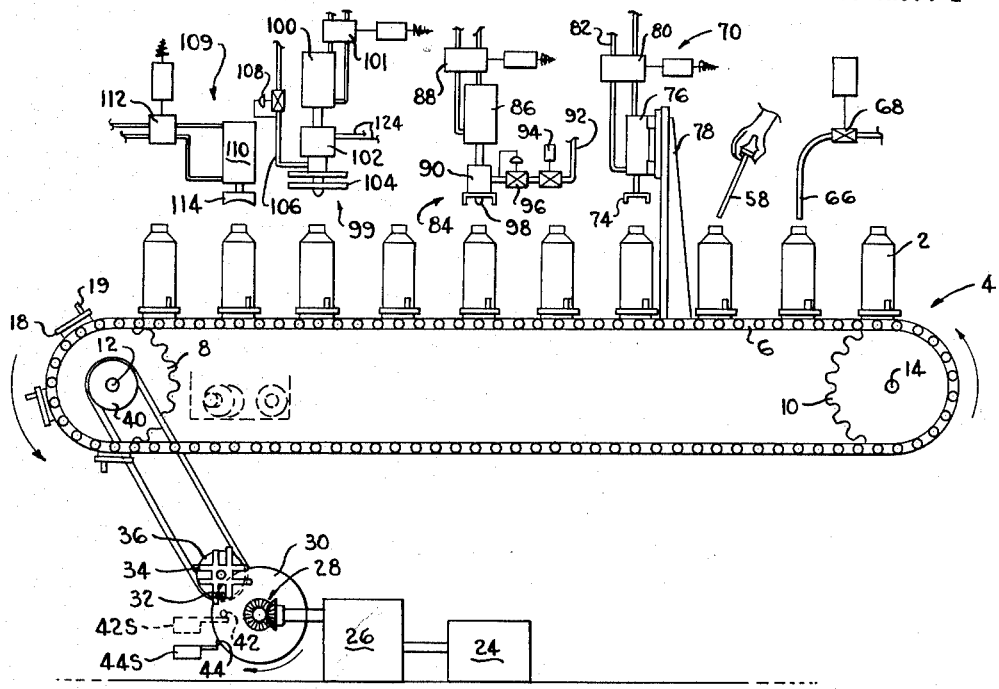
FIG. 1 is a schematic representation of a production line that includes a pressure testing and rejecting device for aerosol-type containers according to the invention, it being understood that the rejecting device is actually mounted to operate in a horizontal direction although it is schematically shown as otherwise.

In FIG. 1 is seen a typical production line for filling aerosol-type containers with a liquid charge and a pressurized gas propellent wherein appropriate means for testing and rejecting the containers for internal pressure are included. The containers 2 have no valve and may conveniently be cans of the general nature as shown in FIG. 2. The cans are manually placed on a track 4 and then are moved by the track 4 past a plurality of stations where filling, testing, and rejecting operations take place. After the sequence of operations has occurred, those cans reaching the opposite end of the track are manually removed, and prepared for packaging and shipping. Appropriate means may be provided for automatically placing the cans on the track and removing the cans which reach the other end of the track.

The track 4 is connected to a suitable mechanism whereby the track moves intermittently. During those times that the track is at rest, selected ones of the cans are disposed adjacent stations where certain operations take place. The particular stations will be further described below. After a predetermined residence time at each station, the track then moves the can in such fashion that it goes to the next station and so forth until it reaches the opposite end of the track or is rejected, as the case may be.

In the embodiment shown, the track 4 comprises a chain 6 supported between a drive sprocket 8 and a driven sprocket 10. The sprockets are mounted on a power shaft 12 and a driven shaft 14, respectively.

Figure 1A:
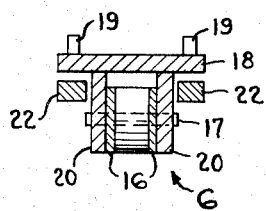
FIG. 1A is a cross section of the track used in FIG. 1.

The chain 6, as best seen in FIG. 1A, further comprises chain links 16 having an extra long pin 17 for connecting the plate 18 to the links by means of engaging the legs 20 depending from the plate. The plate has a pair of fingers 19 extending upwardly therefrom, whereby the bottom edge of the can is engaged therebetween to position the can properly for the operations at the respective work stations. A pair of plate guide and support rods 22 engage the underside of plate 18 and extend a major portion of the way between the sprockets to thereby support the upper horizontal portion of the chain.

Electric motor 24 provides power through a suitable gear train to the power shaft 12, fastened to the drive sprocket 8 and the chain. The output of the motor is connected to a suitable gear transmission 26 (including a clutch, if desired), and the output from the transmission is applied through a pair of miter gears 28 to the drive wheel of a Geneva drive mechanism. The intermittent motion of the cans, along with the requisite residence time at each work station, is obtained by using the Geneva drive or some other suitable means for providing intermittent track motion.

The drive wheel 30 contains a pin 32 which engages the slotted member 34 in well known fashion. The member 34 is mounted on the same shaft with a drive pulley 36 that is connected by a belt to a power shaft pulley 40 which is in turn secured to the shaft 12. The Geneva drive wheel 30 also contains a number of timing cams 42, 44 for actuating switches 42S, 44S respectively, which will be discussed in further detail in connection with FIG. 8. The switches are mounted in any convenient fashion to be engaged by their respective cams.

Before going further, some features should be explained regarding the container and the valve used therewith. As is seen in FIG. 2, the container comprises a generally cylindrical can 2. Actually, the container may be made of metal, glass or other appropriate means for containing a fluid under internal pressure. Ordinarily, such containers have sloping upper shoulders 50 and are circular in cross section, regardless of the material from which the container is constructed. Of course, containers having other specific configurations are usable. The particular container structure does make some difference as to the specific dimensions and details of the adapter as described below with respect to FIG. 4. One suitable type of valve for employment in the practice of the invention is disclosed in United States Patent No. 2,913,-747 issued to Ayres on November 22, 1959. The valve contains an elastomeric diaphragm 52 having a plurality of ports 54 disposed therein. The diaphragm is secured to a support plate 54 by a force fit of the discharge tube member 58 to such plate. The discharge tube extends down to the bottom of the container for assuring that liquid is discharged therethrough.

The support plate 56 includes a plunger port 60 for slidably receiving and supporting a plunger 62. The plunger is shown disassociated from the rest of the valve because it is not inserted until after the can has passed through the various work stations shown in FIG. 1. The plunger has a conduit 63 extending therethrough for leading fluids through itself, the fluids being received from the diaphragm ports 54 through plunger slots 64. The bottom of the plunger port sealingly engages a portion of the diaphragm. The valve is operated in a well known manner by depressing the plunger, whereupon the diaphragm 52 moves away from its seal with the plunger port and fluid flows up the tube 58, through the ports 54, the slots 64, and through the conduit 63. In the embodiment of FIG. 1, a can 2 is placed on an appropriate plate and is moved by the track 4 to a means for introducing a predetermined quantity of fluid, ordinarily a liquid, into the can. Such a means may comprise a filling spout 66 having a solenoid operated valve 68 disposed upstream thereof between the spout and a source of filling fluid. The solenoid valve may advantageously be operated by a timing cam and switch arrangement, the cam of which rotates in unison with the Geneva drive wheel 30. The valve 68 is held open a predetermined length of time in order to place a metered quantity of liquid in the can.

After the valve 68 is closed and the filling process has stopped, the Geneva drive then again moves the can (and in turn brings another can into position at the filling station). A manual operation now takes place wherein the valve minus its plunger is manually inserted in the can.

On the next revolution of the Geneva wheel, or a predetermined number of revolutions later, the can is moved to a valve clamping station denoted generically as 70. At this station there is provided an appropriate means for crimping the support plate edges 72 (see FIG. 2) onto corresponding parts of the can, thereby to seal the liquid in the can and to prepare the can or other container for subsequent filling operations where a pressurized gas is introduced thereinto. The crimping operation, in the embodiment shown, is carried out by a flanged crimp disc 74 that is mounted on the plunger of a pneumatic or hydraulic cylinder 76. The cylinder 76, as are all the other cylinders discussed herein, is supported by an appropriate bracket such as the assembly 78.

The cylinder 76 is of the type wherein a compressed gas or a hydraulic fluid is admitted first to one end of the cylinder, or to the other end of the cylinder, in sequence. Alternatively, the cylinder may comprise a spring-loaded piston for purposes of returning the cylinder to its starting position—the position shown. A crimping control valve 80 (preferably solenoid operated by a timing cam driven in unison with the Geneva wheel, not shown) controls the switching of compressed gas or hydraulic fluid to first one end of the cylinder 76 and then the opposite end of the cylinder whereby the cylinder first moves the crimping disc 74 down to sealingly engage the valve with the container and then after a short predetermined time, returns the crimping disc to the position shown in FIG. 1. Appropriate hydraulic or pneumatic piping 82 is provided. Where the cylinder is spring-loaded to return to its original position, the valve 80 can be a three way valve which exhausts to the atmosphere or some other low pressure region. Alternatively, the valve 80 switches flow from a high pressure region to first one end of the cylinder, then the other and at the same time connects the opposite end of the cylinder to a low pressure of exhaust region.

After the valve has been sealingly crimped to the cylinder to provide the construction such as shown in FIG. 2, the container and the valve assembly (still minus the plunger, of course) is then moved by the track 4 to a position where pressurized gas such as nitrogen or carbon dioxide, a mixture of the two, or other appropriate gas or gasses, is introduced into the valved container. To this end the container is positioned underneath a charging station denoted generically as 84. A pneumatic or hydraulic cylinder 86, controlled by a solenoid switching valve 88 is provided. This arrangement is generally similar, and in fact can be identical to that for the valve crimping station. However, a gas-charging head 90 is mounted on the plunger of the cylinder 86. This head 90 is connected by a pipe 92 to a source of compressed gas, such as one of the conventional steel cylinders in which gaseous nitrogen, carbon dioxide and other industrial gasses are commercially shipped. A solenoid valve 94 controls flow from the cylinder through the filling head and, when the filling head sealingly engages the valve, into the cylinder. The solenoid valve 94 maintains the conduit 92 open for a predetermined length of time, thereby to meter in a sufficient amount of propellent gas that the pressure in the container comes up to a certain level. In the ordinary case, the maximum container pressure is that achieved by setting of the regulator valve 96, which is likewise disposed in the line 92 in series with the solenoid valve 94. The latter feature advantageously obtains a carefully controlled and regulated maximum pressure with a minimum of additional equipment. In the ordinary situation where a steel cylinder is employed as the source of compressed gas, the regulator valve 96 or other means for controlling pressure, is positioned adjacent the cylinder.

The filling head of the charging station 84 is moved down into a position where the hollow needle 98 (similar to 148 of FIG. 3) on the filling head sealingly engages the valve of FIG. 2 by moving down through the plunger port 60 and moving the diaphragm 52 away from its engagement with the plunger port; thereafter, the solenoid valve 94 comes open and admits a pressurized gas through the conduit 92, the filling head 90 and the needle 98, thence into the container 2. After the maximum pressure has been reached, and after a predetermined time, the valve 94 closes and then the cylinder 86 lifts the filling head 90 to the position shown in FIG. 1. Where necessary, flexible piping is used. As previously mentioned, the operation of the valves is advantageously obtained by manipulating timing switches with a timing cam driven in unison with the Geneva wheel 30.

The can is next moved to a pressure testing station, where in the ordinary embodiment it is tested for low pressure. Subsequent to this, the can is moved to a rejection station where cans with an inadequate pressure are rejected and if not rejected move on to the end of the production line where they are removed, the plunger 62 attached, and the can or other container prepared as necessary for shipment.

Apparatus for detecting and testing the container pressure within a valved pressurized container such as that which has passed from the charging station 84 is now encountered by the can or other container as it is moved intermittently on the track to such apparatus which is denoted generically as 99. Referring for the present to FIG. 1, it is seen that the apparatus includes a cylinder 100 controlled as to descending and ascending by the solenoid switching valve 101. A test assembly 102 is secured to the lower end of the plunger of cylinder 100. An adapter 104 is secured to the lower end of the test assembly for purposes of mechanically engaging and accurately positioning the can wherein pressure is to be measured. A flexible conduit 106, or other appropriate means, connects the test assembly to a source of regulated fluid pressure. A pressure regulator 108 is provided at an appropriate point within the conduit.

The rejector assembly 109 is located immediately adjacent the test apparatus 99 at a position to which the can is moved and stopped the next time the Geneva drive assembly causes the track to move. The operation of the rejection assembly is relatively simple, it comprising a cylinder 110 which moves its plunger out to knock the can off the track into a waste basket (not shown). As noted above, the cylinder is mounted so that its plunger moves in a horizontal direction. The rejecter assembly cylinder operation is controlled by a solenoid switching valve 112 and has a container engager 114 connected to the end of the cylinder. In FIG. 1, the rejecter 109 is shown as having a vertical cylinder, it being understood that the cylinder is in fact mounted in a horizontal position so that the engager 114 moves transversely of the track 4 (i.e., perpendicular to the plane of the drawing), contacts the can, and knocks the can or container into the waste basket.

The detailed description of operation of the pressure test apparatus 99 and the rejecter apparatus 109 is deferred until the apparatus described in FIGS. 3 through 8 has been further described.

The test assembly 102, referring to FIGS. 3, 5, and 6, includes a body assembly 115 for mounting on plunger 116 of the cylinder 100. The body assembly includes a plunger mounting block 118 having a threaded hole therein for engagement with the end of the cylinder plunger 116. A removable plate 120 is removably mounted, as by threaded members (FIG. 5), in one side of the plunger block in order to give access for repairs and installation to the switch 122 that is mounted for engagement by rod 129 which is supported to slidably reciprocate in and out of the switch chamber 121 to thereby engage the switch. A pair of wires 124 leads from the switch 122 through a pressure-tight gland assembly 126, thence to connections into the circuit of FIG. 8.

The body assembly 115 has a threaded opening 127 in the bottom thereof which is sealingly threadedly engaged by a switch rod block 128. A switch rod 129 extends from the switching chamber 121, through the block 128, and down to a piston 132 that is disposed within a pressure comparison chamber 134 formed in the comparison block 135 which is in turn threadedly secured to the lower end of the switch rod block. A pressure seal in the upper end of the switch rod block is formed by a gland nut 137 which is threadedly secured into a female threaded joint in the switch rod block and which maintains an O ring 139 in sliding, sealing engagement with the switch rod. The pressure comparison chamber 134 is preferably cylindrical in shape and the piston 132 sealingly engages the walls of the chamber by means of a piston ring such as the O ring 140. The O ring 140 is thus a divider means that separates one side of the piston or chamber from the other, and particularly in combination with the piston provides a divider means which also movably responds to a pressure differential between the faces of the piston.

The flexible hose or other conduit 106 threadedly engages an opening in the comparison block and provides a source of compressing fluid, such as compressed air or the compressed gas provided to conduit 92 of the charging station. To this end, a passageway 142 is provided in the block between the pressure comparison chamber 134 and the end of the flexible conduit. A shoulder 144 is provided at the upper end of the piston where the switch rod 129 connects thereto, whereby the shoulder assures an adequate volume for receiving compressed gas from the conduit 106. This is enabled by the shoulder engaging a corresponding surface on the lower end of the switch rod block 128.

A container-piercing hollow needle 146 is mounted on the comparison block 135, preferably by a threaded engagement with the bottom end thereof as shown in FIG. 3. The outside diameter of this needle, e.g., in the region denoted as 148 of FIG. 3, corresponds substantially to the diameter of the plunger port 60 in the valve of FIG. 2, whereby a sliding sealing fit is provided. Passages 150 near the tip of the needle communicate with a central conduit 152 which is alined with a corresponding conduit in the comparison block to establish pressure communication from the container 2 through the hollow needle and into the portion of the comparison chamber that is in contact with the lower face of the piston. Preferably, shoulders 156 are provided at the lower end of the comparison chamber in order that the face of the piston 132 will not become stuck against the end of the chamber, which might occur in the case of sticky or highly corrosive materials, particularly when the device has been shut off overnight or over a weekend.

Referring now to FIG. 4 there is seen an adapter assembly 104, the general purpose of which is to seat upon the upper edge of the container in such a fashion that the container is alined for piercing by the needle and also in such fashion that the container is held down tight against the plate 18 of the track. The adapter is also designed to accommodate minor deviations in the heights of the containers, which might occur in the course of manufacturing them, or if dirt should get between the can and the track, or other such eventualities. To this end, the adapter has a top mounting plate 160 having a hole 162 drilled therethrough whereby the mounting plate fits very snugly over the comparison block 135. A set screw 164 extends up through one side of the plate.

Referring now to both FIGS. 4 and 7, a plurality of screws, rivets or other such members 166 depend downwardly from the mounting plate. A guide plate 168 slidably engages the members 166, and is held in general parallelism with the mounting plate 160. Means for biasing apart the plates 160 and 168 are provided, preferably in the form of springs 171 which are advantageously mounted to surround the members 166, although of course they can be mounted at other places as long as the biasing forces are kept balances around the plates. A hole 169 is drilled through the guide plate and has at the lower end thereof a container engaging shoulder 170 which is shaped and contoured to matingly engage the shoulder 50 on the can (see FIG. 2).

Referring now to FIG. 8 there is seen an electrical circuit that includes means for indicating when the pressure in the container under test is not at the requisite level. As previously noted, it is preferred that the invention be applied for the determination of container pressures that are too low. Moreover, included in the means for indicating is a means for rejecting, such as that described with respect to the work station 109 for rejecting cans.

In FIG. 8 there are seen two leads 172, 172a which are connected to a source of electrical power, preferably alternating current. A plurality of circuits are connected in parallel between these two leads. One such circuit is for actuating the solenoid 101 of the pressure tester 99. For the sake of convenience, the same reference numeral is used to refer to both the solenoid valve and its associated solenoid element. The solenoid 101 is connected in series with a switch 173 that is operated at predetermined times and maintained in a closed condition for a predetermined period of time by a cam 174 that is driven in unison with the Geneva wheel 30.

The switch 122 of FIG. 3 is a normally closed switch that is connected in wire 124 in series between the normally open switch 42S and a delayed opening relay 175. The construction of relay 175 is such that it automatically comes open a predetermined time after having been actuated. The relay controls two normally open sets of contacts, denoted respectively as 175A and 175B. Contact 175A is disposed in series between the lead 171 and a point between switch 122 and the relay 175.

The switch 44S is normally open and is connected in series with the normally open contact 175B of the delay relay 175. Both of these open switches are connected in series with the solenoid 112.

For the embodiment shown in the drawings, the sequence of operations is as set forth above in order to bring the cam adjacent the pressure tester and reject stations 99, 109. To summarize, the operations are to place the can 2 on the track 4, fill the can with a liquid from the spout 66, manually emplace a valve in the can, crimp the valve in a sealed fashion to the can at the work station 70, inject a propellent such as a pressurized gas at the work station 84, and then to carry out the pressure testing and rejecting operations in sequence. Subsequently, the cans are completed by adding the plunger 62. The cans are moved from one work station to another by means of the intermittent motion of the track 4.

The electrical circuit of FIG. 8 is in the position shown when the can is positioned adjacent the pressure testing station 99. After the can has stopped movement, i.e., after the track has been brought to rest, the cylinder 100 must be actuated so that the plunger descends and engages the adapter 104 with the can and thereafter sealingly engages the hollow needle 148 in pressure communication with the inside of the can. In detail, this is accomplished by the timing cam 174 (which is rotating in unison with the Geneva wheel 30) closing the contacts of normally open switch 173 to thereby actuate the solenoid 101. The solenoid then admits a compressed fluid, e.g., compressed air, to the upper end of the cylinde 100 as seen in FIG. 1 and the plunger 116 then descends and brings the shoulders 170 of the adapter into engagement with the sloping shoulders 50 on the can. The springs 171 are slightly compressed and the needle 148 enters the plunger port 60 and goes far enough into the valve to move the diaphragm 52 away from engagement with the bottom of the plunger port. In this fashion pressure communication is established between the inside of the container 2 and the underside of the piston 132 as seen in FIG. 3.

Pressure comparison takes place by setting up a tug of war on opposite sides of a free piston—one side being a pressure of known amount and the other side being the pressure from each can being tested. If the pressure from the can is greater than standard, the piston moves to the standard side and vice versa. By carefully sensing each such move, and relaying this information to a reject mechanism, the cans may be amply tested as they come down the production line, thereby insuring a proper charge in each can.

Pressure comparison takes place by reason of admitting a pressurized fluid of a known, regulated pressure through the passage 142 to the opposite side of the piston 132. In this fashion, the pressure comparison chamber 134 has two pressures acting in opposition to each other on the piston, whereupon the one generating the greatest force on the piston prevails to determine whether the piston moves up to the position shown in FIG. 3 or whether it moves down against the shoulders 156. In the normal manner of operation, the pressure in conduit 106, and accordingly the pressure on the top of the piston, is adjusted so that the piston moves up responsive to a correct pressure level in the can. In other words, the pressure drawn from the conduit 106 establishes a known predetermined minimum pressure that is compared with the unknown pressure within the can, and if favorably compared the piston moves up and actually engages and operates the switch 122. This opens the switch 122. On the other hand, if the pressure in the can is too low, in the ordinary operation, it is contemplated that the piston 152 will not move up to operate the switch 122 and to open it, in other words leaving the switch 122 in its normally closed condition as seen in FIG. 8. After the pressure has been admitted to the pressure chamber and there has been an opportunity to compare the pressures and to operate the switch 122, the Geneva wheel 30 brings timing cam 42 into engagement with the switch 42S, thereby closing the latter. In response to this event, the delay relay 175 is either operated, or not operated according to the condition of the switch 122. If the pressure within the can was correct and the switch 122 had been moved to the open condition, nothing happens when switch 42S is closed since there is no circuit completed to operate the delay relay. On the other hand, if the pressure within the container has been determined to be too low, the switch 122 will have remained in its normally closed condition, whereupon closing of switch 42S by its cam will actuate the delay relay 175, thus closing the contacts 175A and 175B. The closing of the relay contacts enables the rejecter mechanism to reject the can after it has been moved adjacent the rejecting work station 109.

Next, the cam 174 moves away from the switch 173, thus returning the latter to its normally open condition and causing the solenoid 101 to withdraw the hollow needle from the valve. The Geneva wheel then moves the can that has been tested to the rejecter work station 109. After the track has brought the can to rest adjacent station 109, the normally open switch 44S is closed by its respective cam 44. If the container has too low a pressure, the delay relay 175 will have already closed the switch 175B, whereupon solenoid 112 is actuated responsive to the closing of switch 44S. This in turn causes the plunger of cylinder 110 to move out and the plate 114 to strike the can and knock it off the track. On the other hand, if the pressure in the can had been determined to be correct comparison in the chamber 134, the switch 175B remains in its normally open position whereupon nothing occurs when the switch 44S is closed. The next time the Geneva drive moves the track, the can, if it is still on the track, moves down to a position where it can be removed for subsequent plunger inserting and packaging operations.

In review, it is seen that the invention includes an apparatus for detecting container pressure within a valved pressurized container. Such apparatus comprises a means for comparing container pressure with a standard pressure and providing a signal responsive to a predetermined differential between the two aforementioned pressures. Such a means is found in the test assembly 102. In addition, means for providing a standard pressure to the means for comparing, such as the flexible hose or conduit 106 and the pressure regulating mechanisms therein are connected to an appropriate point of the means for comparing. The hollow needle 148 is used in conjunction with the previously described elements and constitutes an insertable means for insertion into the valved pressurized container to establish a sealed pressure-communicating path between such container and the means for comparing.

The means for comparing also includes the circuit of FIG. 8 which serves to provide a signal responsive to actuation of the piston and the switch rod responsive to a pressure differential. The circuit of FIG. 8 also includes means for transmitting such signals to a container rejecting means such as that found at work station 109. Moreover, the circuit in FIG. 8 performs a choice-making function and chooses which of the signals is transmitted between the pressure comparing means and the rejecting means, whereupon the latter either is or is not enabled.

In connection with the electrical circuit and the sequence of events in carrying out a pressure testing and rejecting operation on one particular can, it is to be noted that the time delay relay 175 automatically breaks the holding circuit through the lead 176 and switch 175 before switch 42S is closed by the cam 42, but after the switch 44S has had an opportunity to be closed. The switching sequence involved in the pressure testing and rejecting of a particular can is as follows: either open switch 122 or let it remain closed (the holding circuit such as through lead 176 and contact 175A should be opened no later than the point in time between the respective immediately preceding and subsequent steps); close switch 42S; withdraw the hollow needle 148 from the can, thereby allowing switch 122 to return to its normally closed position; the holding circuit through switch 175A will keep the relay 175 in engagement until after the rejecting steps have taken place, if the relay 175 has been actuated; the can is now moved to the rejecting station and after being brought to a halt, the switch 44S is closed by its respective cam and if the container pressure has been too low the can will be rejected responsive to this particular switching step.

Inasmuch as a series of containers are being continuously inspected by a system such as shown in FIG. 1, the holding circuit through lead 176 and contact 175A maintains the relay in its engaged position for a predetermined time sufficient for switch 42S to be closed, the hollow needle to be withdrawn from the can, the can to be moved to the rejecting station 109, and for the switch 44S to operate. If desired, the time period can be extended past the time for switch 44S to operate and to a point in time between the next successive opportunity for switch 122 to be operated and the next successive closing of switch 42S.

It is thus seen that the invention includes what might be termed a go-no-go pressure gauge. Moreover, in the method of using such gauge in conjunction with a rejecting means, a method step is carried out where a choice is made between disabling such rejecting means, or enabling such rejecting means, each in response to a predetermined pressure level within the container being inspected.

Various means can be employed for causing the delay relay 175 to come open at a predetermined time. One such means is to connect a heating resistance in series with a bimetallic normally closed switch and dispose these two elements in such relation that the resistance heats the bimetallic element and causes it to break its contact after a predetermined period of time. Such an arrangement should be disclosed in the lead 176. If used, it should be characterized by cooling off rapidly enough that the element returns to its normally closed position at some point during the time period that switch 42S is closed by cam 42. All of the switches are biased to return to their normal positions upon removal of the actuating means such as switch cams and timing cams.

While the invention has been described with respect to a particular embodiment and in a particular environment, it is not intended that the invention be limited strictly thereto. It is intended that the invention include all of those modifications, changes, substitutions and improvements which are within the scope and spirit of the following claims.

I claim:

1. For assorting by detecting container pressure within a valved pressurized container, an apparatus comprising a means for comparing an unknown container pressure with a known pressure and providing a signal responsive to a predetermined differential pressure between the unknown container pressure and a known pressure;
    means for providing a known pressure to said means for comparing;
    insertable means for insertion into a valved portion of a valved pressurized container to establish a sealed pressure-communicating path between the inside of such container and said means for comparing;
    a pressurized container rejecting means for responding to a signal produced by a predetermined differential pressure and thereupon rejecting the container which provided such predetermined pressure responsive to such signal;
    and means for transmitting such signal from said means for comparing to said rejecting means.

2. Apparatus according to claim 1 further including means to position a valved pressurized container, insert the insertable means thereby establishing a pressure in the means for comparing, for withdrawing the insertable means and positioning the container adjacent the rejecting means, all in a predetermined time sequence.

3. For assorting by detecting low pressure within a valved pressurized container, an apparatus comprising
    a body assembly having walls defining respectively a pressure comparison chamber and a switching chamber;
    divider means in said pressure comparison chamber mounted to sealingly engage the walls thereof, for dividing said pressure comparison chamber into first and second zones and for movably responding to a pressure differential across said divider means by enlarging one of said zones;

means for switching mounted in said switching chamber;

means connected between said divider means and said means for switching to translate movable response of said divider means into a predetermined operation of said means for switching;

means for insertion into a sealed hollow container via the valved portion thereof and for establishing a sealed pressure-communicating path between the hollow portion of such container and said first zone;

means connected to said body assembly for establishing in said second zone a predetermined force representative of a standard pressure and for applying said force to said divider means in opposition to another force established in said first zone via said means for insertion;

said another force being representative of pressure within a container;

and rejecter means enabled by said predetermined force exceeding said another force and disabled by said predetermined force being less than said another force.

4. An apparatus according to claim 3 wherein said means for establishing in said second zone further comprises means to provide a standard fluid pressure to one side of said divider means;

and means to stop motion of said divider means past a certain point, thereby providing a pressure receiving space of minimum volume.

5. For detecting low pressure within a valved pressurized container, an apparatus comprising a body assembly having walls defining respectively a pressure comparison chamber and a switching chamber;

a piston slidably mounted in the pressure comparison chamber and sealingly engaging the walls thereof, the slidable piston having a switch rod extending from one face thereof through a body assembly wall and into said switching chamber;

switching means removably mounted in said switching chamber and engageable by said piston switch rod;

a valve-piercing hollow needle mounted on said body assembly with the hollow portion thereof communicating with the pressure comparison chamber and a face of the piston within said pressure comparison chamber;

means for supplying a fluid at a predetermined standard pressure to the opposite face of the piston;

and means connected to the switching means for indicating when the piston switch rod engages and actuates the switching means in response to a predetermined pressure differential on the respective faces of the piston.

6. An apparatus according to claim 5 wherein said means for indicating comprises a delayed opening relay connected in series with said switching means;

said relay having a first contact connected in a holding circuit in parallel with said switching means;

said relay further having a second contact connected in series with an indicator.

7. For assorting by detecting container pressure within a valved pressurized container, an apparatus comprising a means for comparing container pressure with a standard pressure;

means connected to said means for comparing to provide a signal responsive to a predetermined differential pressure between the container pressure and a preselected pressure;

means for providing a standard pressure to said means for comparing; insertable means for insertion into a valved pressurized container to establish a sealed pressure-communicating path between the inside of such container and said means for comparing;

a pressurized container rejecting means for responding to a signal produced by a predetermined differential pressure and thereupon rejecting the container which provided such predetermined pressure responsive to such signal;

and means for transmitting such signal from said means for comparing to said rejecting means;

said means for providing a signal and said means for transmitting a signal further comprising a delayed opening relay having first and second normally open contacts, a first normally open cam-operated switch, a normally closed switch connected in series between said relay and said first cam-operated switch, means for connecting said first contact in a holding circuit in parallel with said normally closed switch and said first cam-operated switch and in series with said relay, a second cam-operated switch, and means for connecting said second relay contact in series with said rejecting means and said second cam-operated switch, and timing means to close said first and second cam-operated switches in sequence.

8. A method for assorting by testing a valved container having disposed therein a fluid under pressure to thereby establish if such pressure is above a predetermined minimum, the method comprising the steps of positioning such container adjacent a differential fluid pressure responsive means;

providing a fluid of predetermined pressure to said means;

establishing a sealed path of pressure communication between the inside of such container via the valved portion of such container to the fluid pressure responsive means;

comparing said predetermined pressure with that inside such container;

either disabling a rejecting means in response to a pressure above said predetermined minimum and maintaining the same disabled until a predetermined time after the sealed path is broken;

or enabling a rejecting means in response to a pressure below said predetermined minimum and maintaining the rejecting means enabled until a predetermined time after the sealed path is broken;

positioning the container adjacent the rejecting means before expiration of said predetermined time;

and rejecting the container responsive to an event actuating the enabled rejecting means.

9. A method according to claim 8 wherein said steps of positioning and establishing are performed in a timed sequence.

References Cited in the file of this patent

UNITED STATES PATENTS

| | | |
|---|---|---|
| 2,013,402 | Cameron | Sept. 3, 1935 |
| 2,352,091 | Fedorchak | June 20, 1944 |
| 2,596,342 | McNutt | May 13, 1952 |
| 2,606,657 | Berthelson | Aug. 12, 1952 |
| 2,749,744 | Doudera | June 12, 1956 |
| 2,902,149 | Blust | Sept. 1, 1959 |